(12) United States Patent
Younce et al.

(10) Patent No.: US 11,092,745 B1
(45) Date of Patent: Aug. 17, 2021

(54) POLARIZATION CONTROLLER

(71) Applicant: Elenion Technologies, LLC, New York, NY (US)

(72) Inventors: Richard Younce, Naperville, FL (US); Matthew Streshinsky, New York, NY (US); Michael J. Hochberg, New York, NY (US)

(73) Assignee: Nokia Solutions & Networks Oy, Espoo (FI)

( * ) Notice: Subject to any disclaimer, the term of this patent is extended or adjusted under 35 U.S.C. 154(b) by 0 days.

(21) Appl. No.: 16/791,258

(22) Filed: Feb. 14, 2020

(51) Int. Cl.
*G02B 6/126* (2006.01)
*G02B 6/27* (2006.01)

(52) U.S. Cl.
CPC ............ *G02B 6/2773* (2013.01); *G02B 6/126* (2013.01); *G02B 6/276* (2013.01); *G02B 6/2726* (2013.01); *G02B 6/2766* (2013.01)

(58) Field of Classification Search
CPC .... G02B 6/2773; G02B 6/276; G02B 6/2766; G02B 6/2726; G02B 6/126
See application file for complete search history.

(56) References Cited

U.S. PATENT DOCUMENTS

| | | | |
|---|---|---|---|
| 9,726,822 B1* | 8/2017 | Ogawa | G02F 1/2257 |
| 9,874,696 B2* | 1/2018 | Liu | G02B 6/126 |
| 2004/0016874 A1* | 1/2004 | Rao | H04J 14/08 250/225 |
| 2016/0313505 A1* | 10/2016 | Ma | G02F 1/0121 |

* cited by examiner

*Primary Examiner* — Ryan A Lepisto
(74) *Attorney, Agent, or Firm* — Stratford Managers Corporation

(57) ABSTRACT

Conventional systems use a polarization-maintaining fiber (PMF) in order to maintain the light in the same polarization between a laser light source and an optical waveguide on a photonic integrated circuit (PIC). A polarization controller may be provided at an input port of the PIC configured for the manipulation of one or both of the $TE_0$ and $TM_0$ polarized light modes. The polarization controller may include a polarization beam splitter/rotator (PBSR), including a plurality of phase tuners and a plurality of couplers which are coupled together by waveguides, all of which are integrated in a device layer on the PIC.

11 Claims, 6 Drawing Sheets

POLARIZATION CONTROLLER

TECHNICAL FIELD

The present invention relates to a polarization controller, and in particular to a polarization controller at an interface between a light source and a photonic integrated circuit (PIC).

BACKGROUND

In conventional optical communication transmission systems, a laser light source 1 is coupled to an optical waveguide 2 on a photonic integrated circuit (PIC) 3 using an optical fiber 4. The optical waveguide 2 may serve as the input to an optical component. The objective in the laser to waveguide coupling is to keep optical losses as low as possible. The laser light source 1 typically produces a highly polarized light with a specific orientation, e.g. the transverse electric (TE) polarization. Furthermore, the optical waveguide 2 in the PIC 3 typically support an optical field that is also orientated horizontal to the PIC substrate, e.g. the (TE) polarization. In order to maintain the light in the same polarization between the laser light source 1 and the optical waveguide 2, current applications of this type use a polarization-maintaining fiber (PMF) as the optical fiber 4 to connect the laser light source 1 to waveguide 2 on the PIC 3. The PMF 4 is designed with an elliptic cross section which supports only the polarization of light that is orientated along the fiber's major axis. In the assembly of the three optical devices, i.e. the laser light source 1, the PIC 3 and the PMF 4, the major axis of the PMF 4 must be rotated to align with the designed optical field orientation of the laser light source 1, when attaching the PMF fiber 4 to the laser chip, and also rotated to align with the designed optical field orientation of the optical waveguide 2 on the PIC 3, when attaching the PMF 4 to the PIC 3. The dual alignment adds complexity and time to the manufacturing process. In addition, the PMF 4 is a specialty fiber with higher costs due to lower volumes.

Accordingly, using high volume Single Mode Fiber (SMF) instead of PMF 4 to connect the laser light source 1 to the PIC 3 would be advantageous. A single mode fiber has a circular cross section and therefore would not require rotational alignment during assembly. The problem with just replacing the PMF 4 with an SMF is that while the light leaves the laser light source 1, TE polarized, as it travels through the SMF the polarization changes and arrives at the optical waveguide 2 of the PIC 3 no longer wholly in the TE polarization mode. The optical waveguide 2 has low loss for TE polarized light but high loss for Transverse Magnetic (TM) mode so that any light at the input of the optical waveguide 2 that is TM polarized will be effectively lost.

An object of the present invention is to overcome the shortcomings of the prior art by providing a single mode fiber (SMF) between a laser light source and a PIC, and a polarization controller to manage the polarization changes in the SMF by combining the input light that arrives in TE and TM polarization modes onto a single waveguide with little loss of either mode.

SUMMARY OF THE INVENTION

Accordingly, the present invention relates to an optical device comprising:

a light source for producing a beam of light comprising a single polarization mode;

a single mode fiber coupled at a first end to the light source, and configured to enable transmission of randomly polarized light, whereby at a second end of the single mode fiber the beam of light includes a first fundamental polarization mode and a second fundamental polarization mode; and a photonic integrated circuit coupled to the second end of the single mode fiber comprising:

a polarization beam splitter/rotator configured to split the beam of light into a first sub-beam comprising the first fundamental polarization mode, and a second sub-beam comprising the second fundamental polarization mode, and for converting the second sub-beam from the second fundamental polarization mode to the first polarization mode;

a polarization combiner for combining the first sub-beam and the second sub-beam into a single output beam; and an optical component configured to receive the single output beam.

BRIEF DESCRIPTION OF THE DRAWINGS

The invention will be described in greater detail with reference to the accompanying drawings which represent preferred embodiments thereof, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
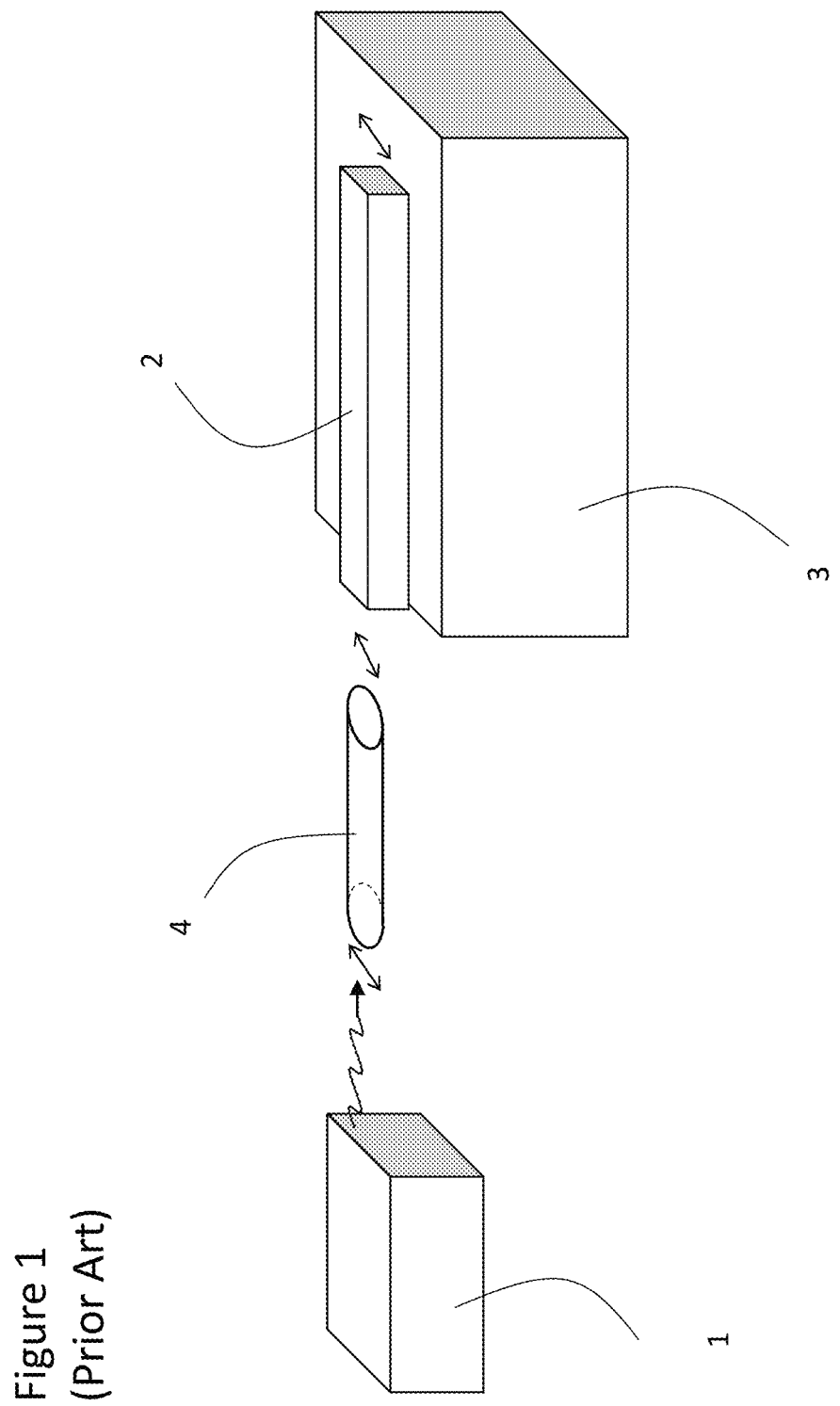
FIG. 1 is an isometric view in accordance with a conventional optical coupling between a laser and a PIC.
Figure 2:
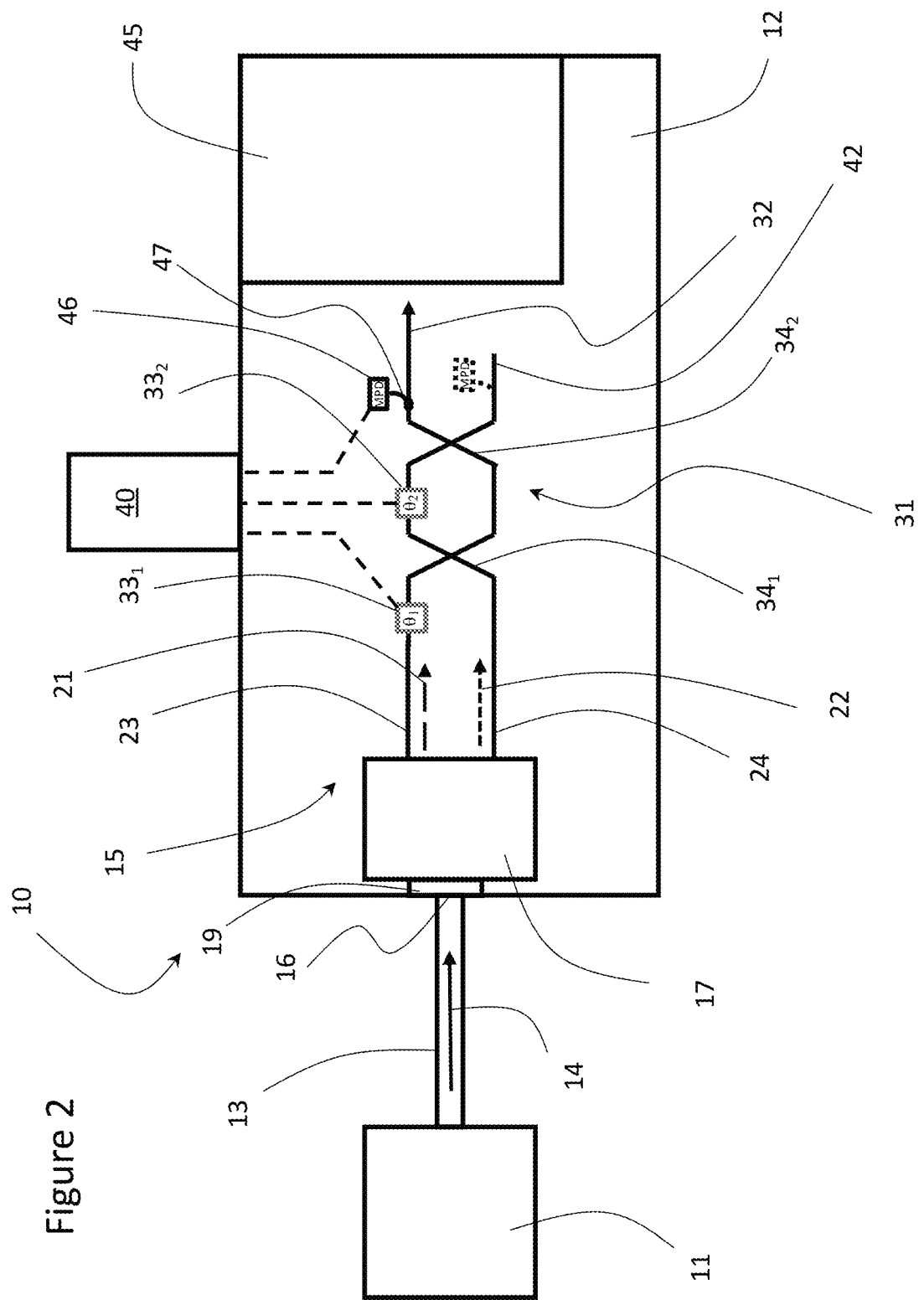
FIG. 2 is a plan view of an optical device in accordance with an embodiment of the present invention.
Figure 3:
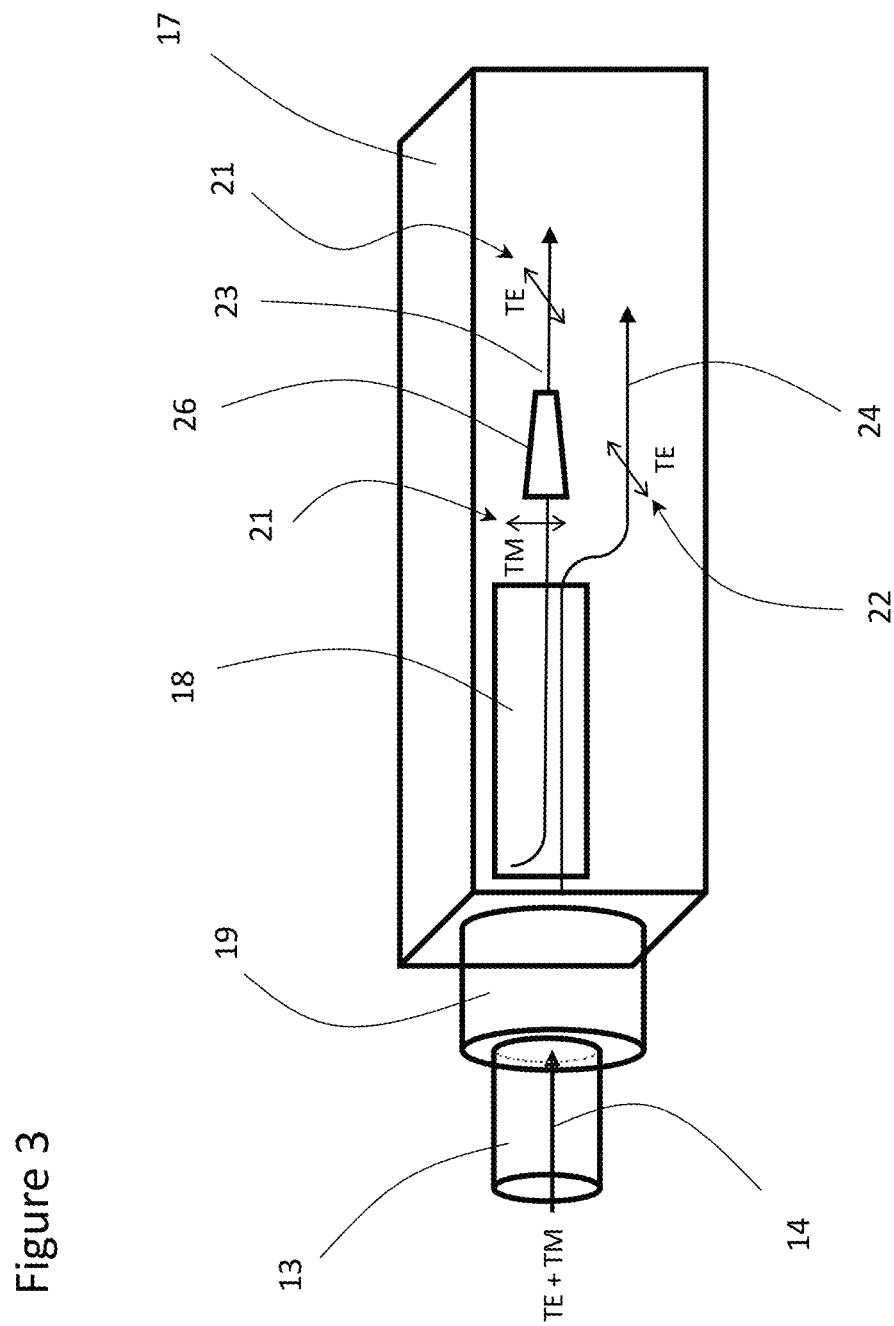
FIG. 3 is an isometric view of the polarization beam splitter/rotator of the device of FIG. 2.
Figure 4:
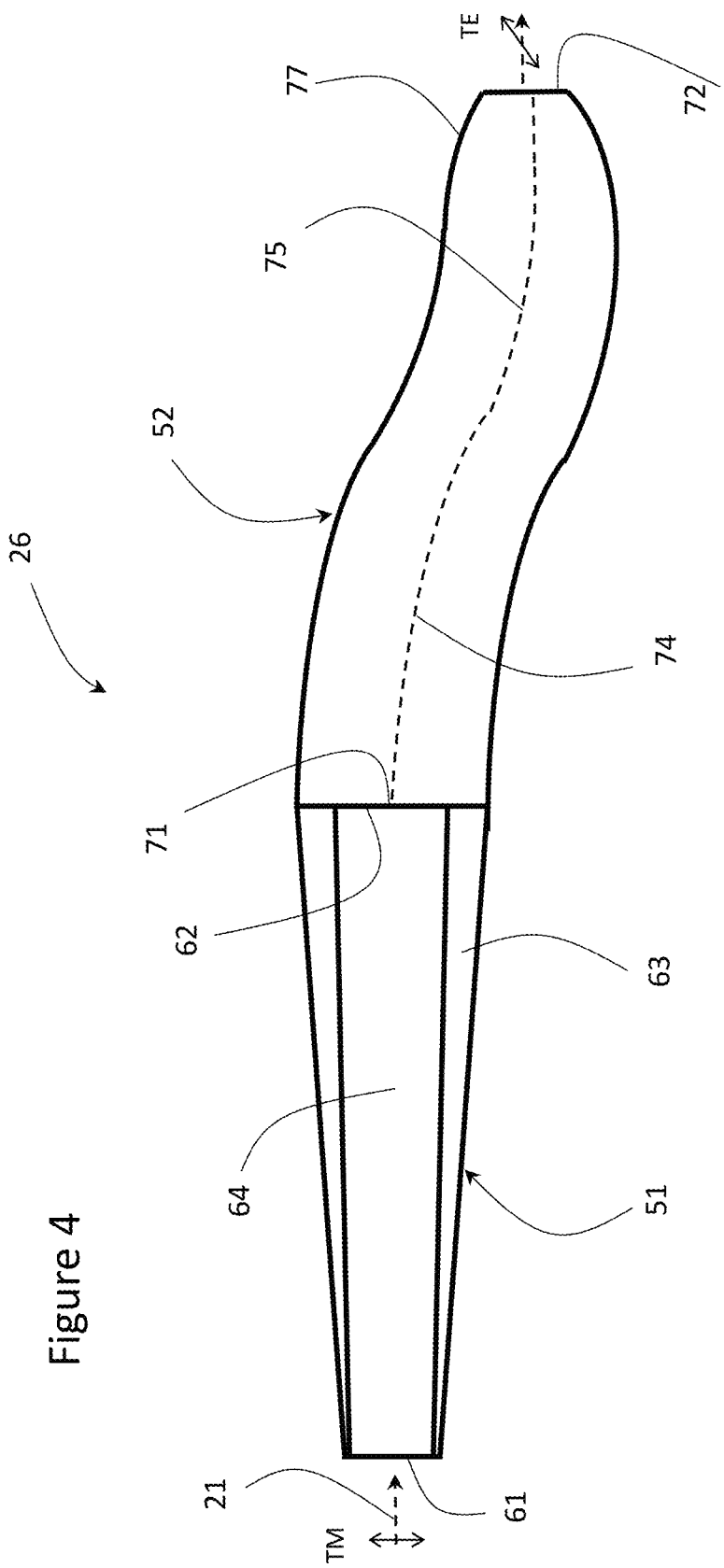
FIG. 4 illustrate an examples of a polarization rotator in accordance with an embodiment of the polarization beam splitter/rotator of FIG. 3.

With reference to FIGS. 2 to 4, an optical device 10 includes a light source 11, e.g. a laser chip, optically coupled to a photonic integrated circuit (PIC) 12 with a single mode fiber (SMF) 13. The light source 11 typically produces a highly polarized light beam 14 with a specific orientation, e.g. the fundamental transverse electric ($TE_0$) polarization mode, but as the light beam 14 travels through the SMF 13, the SMF 13 is configured to enable the transmission of randomly polarized light, whereby the polarization changes and arrives at the PIC 12 with both orthogonal fundamental $TE_0$ and $TM_0$ polarization modes. A polarization controller 15 is provided at an input port 16 of the PIC 12 configured for the manipulation of one or both of the $TE_0$ and $TM_0$ polarized light modes. The polarization controller 15 includes an integrated optical device, in the form of a polarization beam splitter/rotator (PBSR) 17 (FIG. 3), including a beam splitter 18 configured for splitting the $TE_0$ and $TM_0$ polarized light modes into a first sub-beam 21 with $TM_0$ polarized light and a second sub-beam 22 with $TE_0$ polarized light onto a first waveguide 23 and a second waveguide 24, respectively. The beam splitter 18 may comprise a short coupler comprising a primary waveguide, e.g. the first waveguide 23, and a secondary waveguide, i.e. the second waveguide 24, extending adjacent to one another. TE and TM modes have very different coupling lengths, whereby in the short coupler, the $TM_0$ mode, i.e. the first sub-beam 21, will couple off onto the first or primary waveguide 23 from the second or secondary waveguide 24, and the $TE_0$ mode, i.e. the second sub-beam 22 will remain on the second waveguide 24 as the "through" optical signal. The PBSR 17, i.e. the primary waveguide 24, may be optically coupled to an edge coupler 19 at an edge of the photonic optical chip (PIC) 12.

The PBSR 17 also includes a polarization rotator 26 configured to rotate the polarization of at least one of the first and second sub-beams 21 and 22, whereby both sub-beams 21 and 22 have the same polarization. In a preferred embodiment, the polarization of the TM polarized light of the first sub-beams 21 is rotated by 90° to be TE polarized light by using the polarization rotator 26 disposed in the path of the first sub-beam 21. Exiting the PBSR 17, both the first sub-beam 21 and the second sub-beam 22 from the SMF 13 are transmitted as two modes with the same polarization, e.g. TE, traveling in the first and second waveguides 23 and 24, respectively.

One example of a polarization rotator 26 is disclosed in U.S. Pat. No. 9,829,632 issued Nov. 28, 2017 in the name of Ma et al, which is incorporated herein by reference and shown in FIG. 4. The polarization rotator 26 may comprise a bi-layer taper 51 configured as a $TM_0$ to a higher order TE mode, e.g. $TE_1$ mode, converter optically coupled to a bent taper mode converter 52 configured as a higher order TE mode, e.g. $TE_1$ mode to a $TE_0$ mode converter. The bi-layer taper 51 includes a narrower input port 61 and a wider output port 62, and includes a first layer 63, e.g. a slab, and a second layer 64, e.g. a ridge, overlying the first layer 63. The first layer 63 and the second layer 64 typically have different layer heights and different, varying, e.g. expanding, layer widths. The first (slab) layer 63 may expand, e.g. at a constant rate, from the input port 61 to the output port 62, and the second (ridge) layer 64 may expand at a smaller taper or have a constant width, whereby the input port 61 is substantially the same width for the first layer 63 and the second layer 64, but at the output port 62 the first layer 63 is substantially wider, e.g. 1.5×-2×, than the second layer 64.

The bent taper mode converter 52 has a wider first port 71, optically coupled to the output port 62 and a narrower second port 72, and includes a first in-plane waveguide bend 74 proximate to the first port 71, and a second in-plane waveguide bend 75 connected to the first waveguide bend 74 and proximate to the second port 72. The first waveguide bend 74 and the second waveguide bend 75 have opposite curvature directions and form an S-bend. The second waveguide bend 75 includes a tapered portion 77 proximate to the second port 72, having a waveguide width that tapers towards the second port 72, to approximately the same width as the input port 61, e.g. sized for single mode transmission.

Another example of a complete PBSR 17 may comprise the polarization splitter and rotator disclosed in U.S. Pat. No. 9,874,696 issued Jan. 23, 2018 in the name of Liu et al, which is incorporated herein by reference and shown in FIG. 5. The PBSR 17 may comprise a high-index contrast semiconductor waveguide structure, e.g. a high index contrast silicon waveguide structure, including a tapered rotator 81 and a Y-splitter 82 optically coupled to the tapered rotator 81. The high-index contrast semiconductor waveguide structure may be fabricated on a semiconductor substrate, such as silicon, SOI or other suitable Group III/V semiconductor material.

Figure 5:
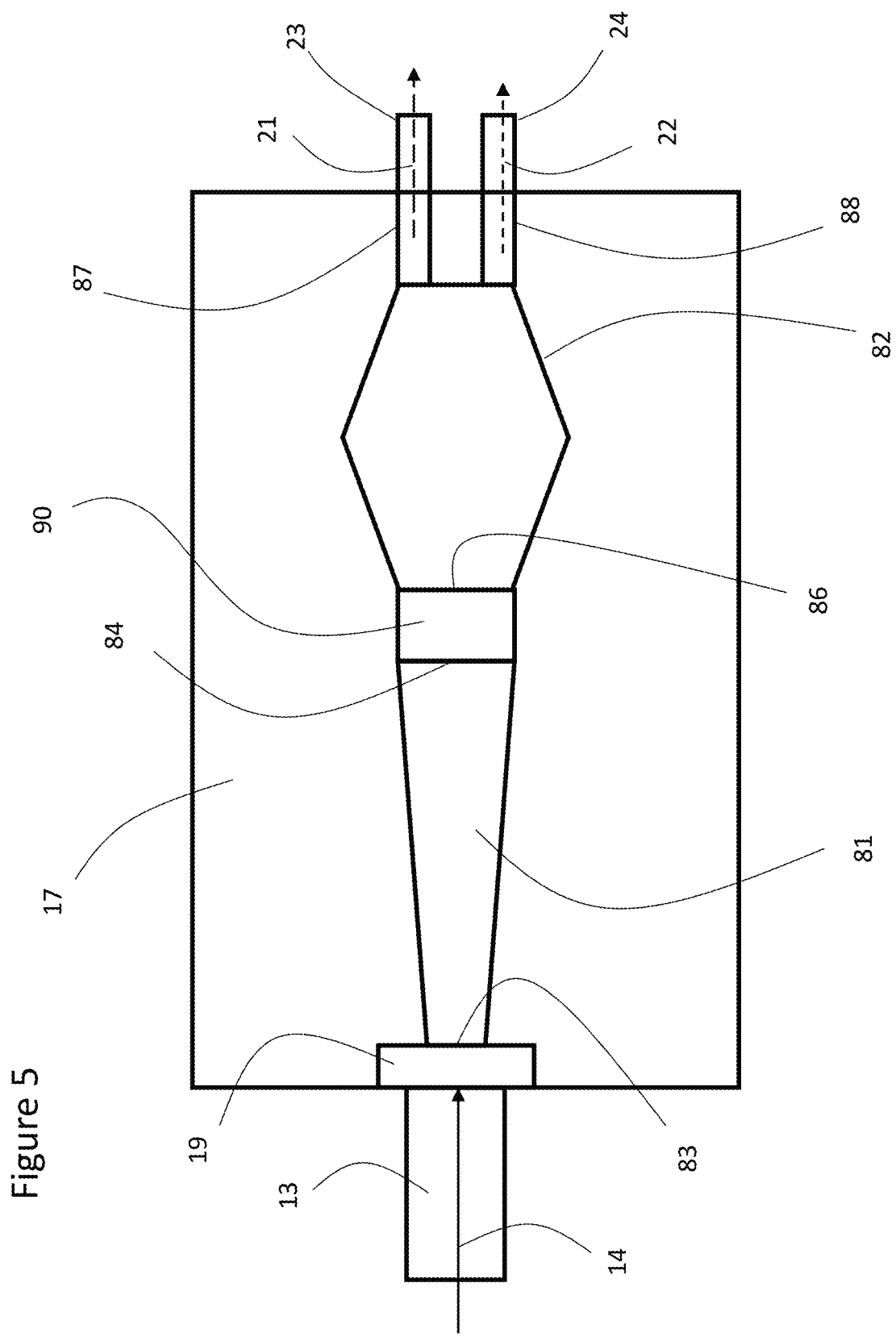
FIG. 5 illustrates another example of a polarization beam splitter/rotator.

The light beam 14 is received from the edge coupler 19 at an input 83 of the tapered rotator 81, and the $TM_0$ mode of the light beam 14 is rotated into a higher order TE mode, e.g. $TE_1$ mode, by the tapered rotator 81, while the $TE_0$ mode is left undisturbed, remaining in the $TE_0$ mode. Expressed in mathematical terms, the tapered rotator 81 converts the orthogonal basis of polarizations from $TE_0+TM_0$ to $TE_0+TE_1$. The $TE_0$ and $TE_1$ modes exit an output 84 of the tapered rotator 81, and enter an first port 86 of the Y-splitter 82. The Y-splitter 82 splits the $TE_0$ and $TE_1$ modes, which produces distinct $TE_0$ modes, i.e. the first sub-beam 21 and the second sub-beam 22, at a second port 87 and a third port 88, respectively. The Y-splitter 82 functions as a 3 dB divider just as a Y-junction. With reference to FIG. 5, a first portion of the TE0 mode is transmitted to the second port 87, while a second portion of the $TE_0$ mode is transmitted to the third port 88. Typically, the first and second portions are equal, e.g. 50%; however, any percentage may be provided, depending on the design of the splitter 82 and the requirements of the components on the PIC 12.

In a preferred embodiment, a PDL tuning section 90 may be provided between the rotator 81 and the splitter 82. Typically, the shape of the $TE_0$ and $TE_1$ modes may be deformed, i.e. expanded and/or compressed, by the shape of the PDL tuning section 90, e.g. gradual narrowing to widths less than the wide end of the tapered rotator 81 and the splitter 82 and/or broadening to widths greater than the wide end of the tapered rotator 81 and the splitter 82, whereby the phase may be delayed between the portions of the $TE_0$ and $TE_1$ modes during splitting. The PDL tuning section 90 enables the PBSR 17 to generate and instill a specific PDL, a minimum PDL, a higher splitting efficiency, or a minimum PDL with highest achievable splitting efficiency for the first sub-beam 21 and the second sub-beam 22. Ideally, the PDL tuning section 90 is symmetrical, about a longitudinal axis along the direction of light propagation, to provide equal splitting for the $TE_0$ and $TE_1$ modes.

Figure 6:
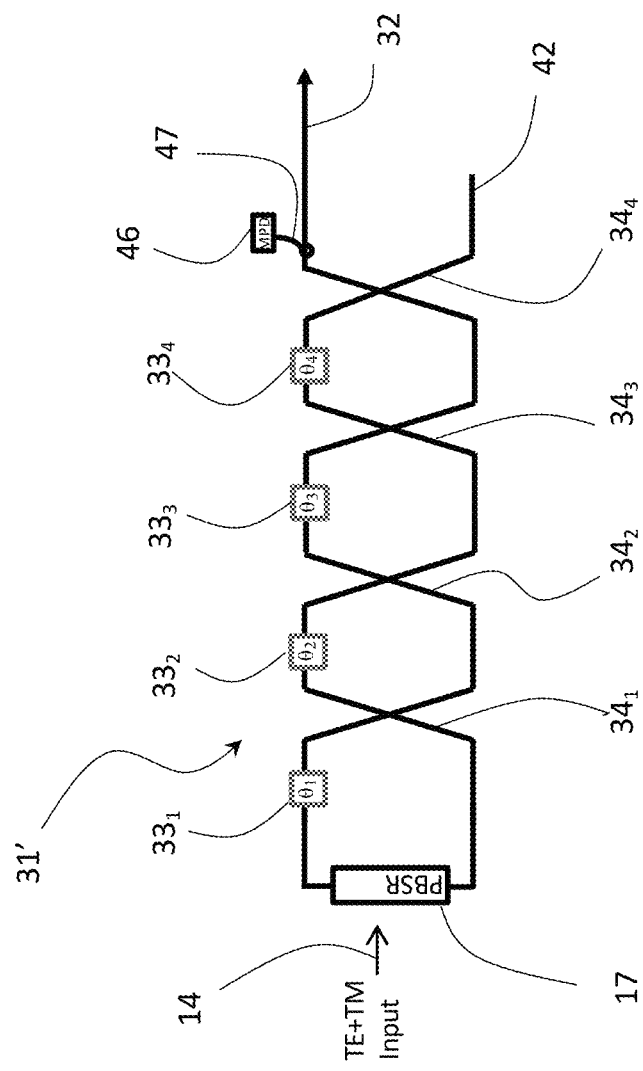
FIG. 6 is a plan view of an alternative embodiment of the polarization combiner of the device of FIG. 2.

One way to combine the first sub-beam 21 in the first waveguide 23 with the second sub-beam 22 in the second waveguide 24 is to use a polarization combiner (PC) 31. There may be many structures for the PC 31 that are configured for general polarization control applications. The illustrated PC 31 may receive any combination of TE and TM input light, i.e. any input State of Polarization (SOP), and place all the light from both the first sub-beam 21 and the second sub-beam 22 on a single output waveguide or port 32, as shown in FIGS. 2 and 6. The structure of the PC 31 includes a plurality of phase tuners $33_1$ to $33_n$ ($33_1$ and $33_2$ shown) and a plurality of couplers $34_1$ to $34_n$ ($34_1$ and $34_2$ shown) which are coupled together by waveguides, all of which are integrated in a device layer on the PIC 12. Each coupler $34_1$ to $34_n$ may comprise a 2×2 50/50 waveguide coupler including two input ports, two output ports, and an multi-mode interference MMI region, but other configurations are possible. The two input ports of the first coupler $34_1$ may be coupled to the first and second waveguides 23 and 24, respectively, and the two output ports of the first coupler $34_1$ may be coupled to the two input ports of the second coupler $34_2$, respectively. Each of the plurality of phase tuners $33_1$ to $33_n$ may be followed by one of the plurality of couplers $34_1$ to $34_n$ in an alternating fashion, e.g. the first phase tuner $33_1$ is optically coupled to one of the two input ports of the first coupler $34_1$, and the second phase tuner $33_2$ is disposed between one of the output ports of the first coupler $34_1$ and one of the input ports of the second coupler $34_2$. Accordingly, the first sub-beam 21 and the second sub-beam 22 are combined in the first coupler $34_1$, which outputs a first combined sub-beam and a second combined sub-beam via the two output ports. The second phase tuner $33_2$ then adjusts the phase of one of the first combined sub-beam and the second combined sub-beam, which are then combined in the second coupler $34_2$. The final phase tuner $33_n$ then adjusts the phase of one of the previously combined and separated sub-beams from the previous coupler $34_{n-1}$, which are then combined in the last coupler $34_n$. The last coupler $34_n$ outputs substantially all of the combined sub-beams to the single output waveguide or port 32. The variable phase tuners $33_1$ and $33_2$ may be connected by electrical trace connectors in the PIC 12 to a controller 40, which may set the variable phase tuners $33_1$ to $33_n$ to maximize the optical power on the output waveguide 32, which then connects to an optical component 45, e.g. an optical modulator. One of the output ports of the last coupler $34_n$, e.g. $34_2$, is coupled to the output waveguide 32, while the other output port of the last coupler $34_n$, e.g. $34_2$, may be coupled to a terminated waveguide 42. A monitor photo diode (MPD) 46, electrically connected to the controller 40 and optically connected to the output waveguide 32, may be used to provide an indication of the optical power of the single output beam in the first output waveguide 32 for the maximization control process used by the controller 40 to control the phase tuners $33_1$ to $33_n$. A small portion, e.g. 3%-6%, of the light in the output waveguide 32 may be tapped off using a tap 47 coupled to the MPD 46. Alternatively, the MPD 46 and the tap 47 may be disposed on the terminated waveguide 42 and may be used in a minimization control routine, i.e. to provide an indication of the optical power of the output beam in the output waveguide 32, employed by the controller 40 to control the phase tuners $33_1$ to $33_n$.

The input SOP from the SMF 13 is not necessarily constant over time and so the set of phases used by the controller 40 to control the phase tuners $33_1$ to $33_n$ to maximize the output power on the output waveguide 32 during initialization of the PC 31 may be different at some later time. The polarization may be time variant because of changes in mechanical stress or thermal variation in the SMF 13. Accordingly, an active control system may be employed by the controller 40 to continuously track polarization changes in the PC 31, and in particular in the output waveguide 32. Tracking the polarization changes may be as simple as dithering the phases of the phase tuners $33_1$ to $33_n$ with the objective of maximizing the PC output power in the output waveguide 32, e.g. or at least until a desired threshold (maximum or minimum) of output power in the output waveguide 32 or the terminated waveguide 42 is reached or exceeded. The control system may comprise computer software stored in non-transitory memory executable on a processor, all or portions of which may be provided in the controller 40 or in a remote location connected thereto.

One potential problem of the PC 31 is that the range of control is limited by the range over which the phases tuners $33_1$ to $33_n$ may vary. Phase tuners $33_1$ to $33_n$ are typically voltage or current controlled and their range are limited by their control electronics. Polarization changes in the SMF 13 may eventually lead the phase tuners $33_1$ to $33_n$ to their control limits at which time, the SOP can no longer be tracked and the optical power on the output waveguide 32 will begin to drop. If the phase tuners $33_1$ to $33_n$ are designed with a radian range, they can generally control any a radian rotation of the input SOP before they reach their limit.

If the SMF 13 connecting the light source 11 to the PIC 12 is short and straight and the temperature rise of the whole optical device 10 changes evenly, then the SOP changes can be relatively small and so the simple PC 31 of FIG. 2 may be sufficient in maintaining power into the optical component 45, e.g. modulator, without running out of range in the phase tuners $33_1$ to $33_n$. If the SMF 13 has stress inducing bends and uneven thermal changes, then an endless PC 31' may be needed to maintain the power into the optical component 45. One common structure for an endless PC 31', illustrated in FIG. 6, adds two more phase tuners 333 and 334 to the simple PC 31 of FIG. 2.

The PC 31, which is comprised of the two phase tuners $33_1$ and $33_2$ separated by couplers $34_1$ and $34_2$, may be able to translate any input SOP to any output SOP which enables all the input optical power to be placed on output port 32. However, one or more additional stages of phase tuners 33 and couplers 34 may be included in the PC 31, as illustrated in FIG. 6 to enable "endless" polarization control by the controller 40. To illustrate this consider using the first pair of phase tuners $33_1$ and $33_2$ to track polarization and maintain maximum optical power on the output waveguide 32 while the second pair of phase tuners 333 and 334 are left at some nominal value in the center of their control range. Once the control limit is reached in the first two phase tuners $33_1$ and $33_2$, the third and fourth phase tuners 333 and 334 may be configured to continue to track polarization while the first two phase tuners $33_1$ and $33_2$ are concurrently reset to the center of their control range. This provides a reset free or endless polarization tracking ability to the PC 31. Accordingly, a plurality of phase tuners $33_1$ to $33_n$ sequentially adjust a phase difference between respective incoming sub-beams 21 and 22; and the plurality of couplers $34_1$ to $34_n$ sequentially combine the respective incoming sub-beams 21 and 22, and sequentially output combined sub-beams 21 and 22 until the final coupler $34_2$ or $34_n$, which outputs the single output beam to the output waveguide 32 and minimal, if any, light to the terminated waveguide 42. It should be noted that while the invention is described with waveguides that carry TE light, it is not limited to applications of this particular mode, it is only used to simplify the description of the invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An optical device comprising:
    a light source for producing a beam of light comprising a single polarization mode;
    a single mode fiber coupled at a first end to the light source, and configured to enable transmission of randomly polarized light, whereby at a second end of the single mode fiber the beam of light includes a first fundamental polarization mode and a second fundamental polarization mode; and
    a photonic integrated circuit coupled to the second end of the single mode fiber comprising:
        a polarization beam splitter/rotator configured to split the beam of light into a first sub-beam comprising the first fundamental polarization mode, and a second sub-beam comprising the second fundamental polarization mode, and for converting the second sub-beam from the second fundamental polarization mode to the first polarization mode;
a polarization combiner for combining the first sub-beam and the second sub-beam into a single output beam; and
an optical component configured to receive the single output beam;
wherein the polarization combiner comprises:
a first phase tuner for adjusting a phase of one of the first sub-beam or the second sub-beam;
a first coupler for combining the first sub-beam and the second sub-beam, and outputting a first combined sub-beam and a second combined sub-beam;
a second phase tuner for adjusting the phase of one of the first combined sub-beam and the second combined sub-beam;
a second coupler for combining the first combined sub-beam and the second combined sub-beam;
a third phase tuner configured for adjusting the phase of one of the first sub-beam or the second sub-beam, while the first phase tuner is being reset;
a third coupler for combining the first sub-beam and the second sub-beam, and outputting the first combined sub-beam and the second combined sub-beam;
a fourth phase tuner for adjusting the phase of one of the first combined sub-beam and the second combined sub-beam, while the second phase tuner is being reset; and
a fourth coupler for combining the first combined sub-beam and the second combined sub-beam, and outputting the single output beam.

2. The optical device according to claim 1, further comprising a controller for adjusting the first phase tuner and the second phase tuner to maximize output power of the single output beam.

3. The optical device according to claim 2, further comprising a monitor photo diode configured to provide an indication of the output power of the single output beam to the controller.

4. The optical device according to claim 3, wherein the controller is configured to dither phases of the first phase tuner and the second phase tuner until the output power of the single output beam exceeds a desired threshold.

5. The optical device according to claim 1, further comprising a controller configured for tracking polarization with the first phase tuner and the second phase tuner until a control limit in the first phase tuner and the second phase tuner is reached, and then tracking polarization with the third phase tuner and the fourth phase tuner, while the first phase tuner and the second phase tuner are concurrently reset.

6. The optical device according to claim 1, wherein the polarization beam splitter/rotator includes a coupler comprising a primary waveguide coupled to the single mode fiber, and a secondary waveguide adjacent to the primary waveguide, wherein the coupler is configured to couple the second sub-beam off of the primary waveguide onto the secondary waveguide, and the first sub-beam remains on the primary waveguide.

7. The optical device according to claim 6, wherein the polarization beam splitter/rotator further comprises:
a bi-layer taper configured to convert the second sub-beam to a higher-order second polarization mode than the second sub-beam; and
a bent taper mode converter configured to convert the second sub-beam to comprise the first fundamental polarization mode.

8. The optical device according to claim 1, wherein the polarization beam splitter/rotator includes a tapered rotator and a Y-splitter optically coupled to the tapered rotator;
wherein the tapered rotator is configured to rotate the second fundamental polarization mode into a higher order mode of the first fundamental polarization mode, while leaving the first fundamental polarization mode undisturbed; and
wherein the Y-splitter splits the higher order mode of the first polarization mode and the first fundamental polarization mode, thereby producing the first sub-beam and the second sub-beam each comprising the first fundamental polarization mode.

9. The optical device according to claim 8, further comprising a PDL tuning section between the tapered rotator and the Y-splitter configured to deform shapes of the higher order mode of the first polarization mode and the first fundamental polarization mode.

10. The optical device according to claim 9, wherein the PDL tuning section expands to a width greater than a wide end of the tapered rotator, and/or narrows to a width less than the wide end of the tapered rotator, thereby instilling a phase delay between the higher order mode of the first polarization mode and the first fundamental polarization mode.

11. The optical device according to claim 1, wherein the optical component comprises an optical modulator.

* * * * *